3,265,696
PYRIDYLETHYLATED 4(1H)-QUINAZOLINONES AND DERIVATIVES THEREOF

Edgar S. Schipper, Clifton, N.J., assignor to Shulton, Inc., Clifton, N.J., a corporation of New Jersey
No Drawing. Filed July 2, 1964, Ser. No. 380,060
7 Claims. (Cl. 260—256.4)

The invention relates to pyridylethylated 4(1H)-quinazolinones and their non-toxic salts.

The pyridylethylated 4(1H)-quinazolinones of this invention are new compounds having the following formula:

(I) 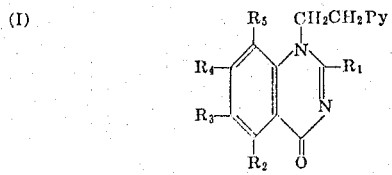

in which Py is pyridyl; $R_1$ is either hydrogen or lower alkyl and $R_2$, $R_3$, $R_4$ and $R_5$, which may be the same or different, are hydrogen, lower alkoxy or halogens, such as bromine or chlorine. Examples of lower alkyl are those containing less than 6 carbon atoms, such as methyl, and examples of lower alkoxy are those containing less than 6 carbon atoms, such as methoxy.

The compounds of this invention manifest central nervous system depressant activity in animals at dosages from 10 to 300 mg. per kg. of body weight. Such dosages are significantly lower than the respective $LD_{50}$ of such compounds.

The new pyridylethylated 4(1H)-quinazolinones of this invention may be produced by reacting a substituted 2-β-pyridylethylaminobenzamide with an excess of ethylorthoformate in accordance with the following reaction:

(2) 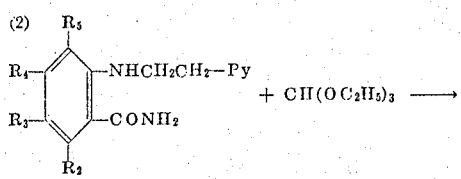

in which Py and $R_2$ through $R_5$ have the same meaning as heretofore defined.

In the event that $R_1$ of the pyridylethylated 4(1H)-quinazolinones is a lower alkyl, the pyridylethylated 4(1H)-quinazolinones may be prepared by the acylation of a 2-β-(4-pyridyl)ethylbenzamide, as typified by the following reaction:

(3) 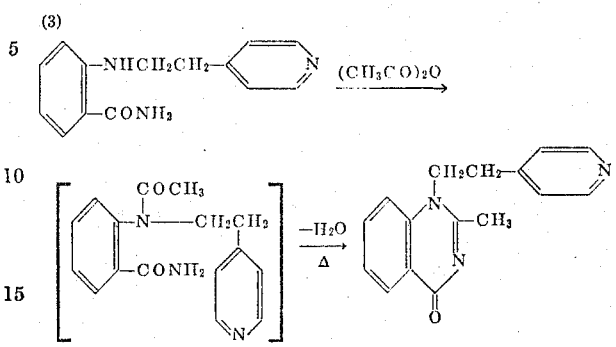

Non-toxic salts of the pyridylethylated 4(1H)-quinazolinones of this invention are produced by mixing equimolecular amounts of the required pyridylethylated 4(1H)-quinazolinones and the required acid in an inert solvent such as ether, ethanol, benzene or toluene, and subsequently filtering the precipitated salts or evaporating the solvent and recovering the solid residue. Salts of inorganic acids such as hydrochloric, sulfuric or phosphoric acids or salts of organic acids such as acetic, succinic, tartaric or ascorbic acid of the pyridylethylated 4(1H)-quinazolinones may be produced in this manner.

A more comprehensive understanding of this invention is obtained by reference to the following examples:

Examples 1–5

1-β-(2-pyridyl)ethyl-4(1H)-quinazolinone;
1-β-(4-pyridyl)ethyl-4(1H)-quinazolinone;
1-β-(4-pyridyl)ethyl-6-chloro-4(1H)-quinazolinone;
1-β-(4-pyridyl)ethyl-7-chloro-4(1H)-quinazolinone;
1-β-(4-pyridyl)ethyl-5-methoxy-4(1H)-quinazolinone.

Each of the above pyridylethylated 4(1H)-quinazolinones was prepared by reacting a solution of 0.1 M of the anthranilamide required and denoted in the following Table I, with 500 ml. of ethylorthoformate. The reaction mixture was refluxed for 12–48 hours. The solution was condensed to half-volume and upon cooling the solid product precipitated and was collected by filtration. For final purification, it was recrystallized from the solvent indicated in Table II.

TABLE I

| Example | Pyridylethylated 4(1H)-quinazolinone produced | Anthranilamide intermediate used |
|---|---|---|
| 1 | 1-β-(2-pyridyl)ethyl-4(1H)-quinazolinone. | 2-β-(2-pyridyl)ethyl-aminobenzamide. |
| 2 | 1-β-(4-pyridyl)ethyl-4(1H)-quinazolinone. | 2-β-(4-pyridyl)ethyl-aminobenzamide. |
| 3 | 1-β-(4-pyridyl)ethyl-6-chloro-4(1H)-quinazolinone. | 2-β-(4-pyridyl)ethyl-amino-5-chlorobenzamide. |
| 4 | 1-β-(4-pyridyl)ethyl-7-chloro-4(1H)-quinazolinone. | 2-β-(4-pyridyl)ethyl-amino-4-chlorobenzamide. |
| 5 | 1-β-(4-pyridyl)ethyl-5-methoxy-4(1H)-quinazolinone. | 2-β-(4-pyridyl)ethyl-amino-6-methoxybenzamide. |

The following table shows the solvent which was used in the recrystallization of the 1-pyridylethylated 4(1H)- quinazolinones of each of the examples and melting point, analysis of carbon, hydrogen and nitrogen, as calculated and found, and yield of each of the pyridylethylated 4(1H)-quinazolinones produced by the practice of each of the examples.

At the lower intraperitoneal dosage level tested of 10 mg./kg. of body weight, the 1-β-(4-pyridyl)ethyl-4-(1H)-quinazolinone significantly prolonged hexobarbital sleeping time.

The results of this study indicate that the compound of

TABLE II

| Example | Solvent Used in Recrystalization | M.P.,° C. | Analysis | | | | | | Yield, Percent |
|---|---|---|---|---|---|---|---|---|---|
| | | | Calculated | | | Found | | | |
| | | | C | H | N | C | H | N | |
| 1 | Ethyl acetate/ethanol | 174–175 | 71.70 | 5.21 | 16.72 | 71.52 | 5.44 | 16.47 | 72 |
| 2 | do | 202–203 | 71.70 | 5.21 | 16.72 | 71.77 | 5.25 | 16.72 | 67 |
| 3 | Methanol | 194–195 | 63.05 | 4.23 | 14.71 | 62.79 | 4.20 | 14.69 | 33 |
| 4 | Ethyl acetate | 180–182 | 63.05 | 4.23 | 14.71 | 62.75 | 4.56 | 14.54 | 48 |
| 5 | do | 174–175 | 67.68 | 5.37 | 14.94 | 67.90 | 5.45 | 14.87 | 28 |

*Example 6.—1-β-(4-pyridyl)ethyl-2-methyl-4(1H)-quinazolinone*

The 1-β-(4-pyridyl)ethyl - 2 - methyl-4(1H)-quinazolinone was prepared by adding 20 ml. of acetyl chloride dropwise to an ice-cold and stirred solution of 500 ml. of pyridine. A solution of 50 g. of 2-β-(4-pyridyl)ethylbenzamide in 500 ml. of pyridine was added over a 15 minute interval keeping the temperature below 10° C. by means of an ice bath. The reaction mixture was stirred at 10° C. for one hour and the solvent was evaporated under reduced pressure. The residue was dissolved in 200 ml. of 10% hydrochloric acid. The solution was filtered and the filtrate made basic with 10% sodium hydroxide. The solid product was filtered off, washed with water, dried, heated at 135° C. for 20 minutes and finally recrystallized with ethyl acetate to give 40 g. (73%) yield of the desired product. The melting point of the 1-β-(4-pyridyl)ethyl - 2 - methyl-4(1H)-quinazolinones was 159–160° C. Analysis showed it to contain 72.72% carbon, 5.72% hydrogen and 15.87% nitrogen compared with theoretical quantities of 72.43% carbon, 5.70% hydrogen and 15.88% nitrogen.

Pharmacological tests were conducted to ascertain the effect of a compound of this invention in the prolongation action of hexobarbital. For this purpose 1-β-(4-pyridyl)ethyl-4(1H)-quinazolinone of Example 2 was selected for this study. The procedure of the testing was as follows:

Adult, male Swiss albino mice (18 to 30 g.) were divided into groups of ten and fasted overnight. The 1-β-(4-pyridyl)ethyl - 4(1H) - quinazolinone was administered intraperitoneally at the dosage levels indicated in Table III ten minutes prior to the intraperitoneal injection of 100 mg./kg. of hexobarbital sodium. Control mice received the same dose of hexobarbital sodium without pretreatment. The interval between the loss and spontaneous return of the righting reflex (sleeping time) was recorded for each animal and mean sleeping times for treated and control groups were compared statistically.

Solutions of the test material were prepared daily by dissolving the weighed amount of the sample in a minimal amount of 1.0 N HCl and diluting to final volume with saline. The concentration of the test solutions was 10 mg./ml.

The results of this study are summarized in Table III. These results show that 1-β-(4-pyridyl)ethyl-4(1H)-quinazolinone markedly prolonged hexobarbital sleeping time at the 100 mg./kg. dosage level.

this invention tested significantly prolonged hexobarbital sleeping time.

TABLE III.—THE EFFECTS OF PRETREATMENT WITH 1-β-(4-PYRIDYL) ETHYL-4(1H)-QUINAZOLINONE ON HEXOBARBITAL SLEEPING TIME IN MICE [1]

| Dosage Level (mg./kg.) | Mean Sleeping Time ± S. D. (Minutes) | |
|---|---|---|
| | Pretreated | Controls |
| 100 | 214.6 ± 44 | 33.3 ± 12 |
| 10 | 69.6 ± 21.7 | 42 ± 9.4 |

[1] Hexobarbital sodium, 100 mg./kg. intraperitoneally administered 10 minutes after pretreatment; 10 mice injected at each dose level.

What is claimed is:

1. A compound selected from the class consisting of pyridylethylated 4-(1H)-quinazolinones and non-toxic acid addition salts thereof, said pyridylethylated 4-(1H)-quinazolinones having the formula:

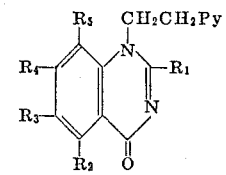

in which Py is selected from the group consisting of 2-pyridyl and 4-pyridyl; $R_1$ is selected from the group consisting of hydrogen and lower alkyl and $R_2$, $R_3$, $R_4$ and $R_5$ are selected from the group consisting of hydrogen, lower alkoxy bromine and chlorine.

2. 1-β-(2-pyridyl)ethyl-4-(1H)-quinazolinone.
3. 1-β-(4-pyridyl)ethyl-4-(1H)-quinazolinone.
4. 1-β-(4-pyridyl)ethyl-6-chloro-4-(1H)-quinazolinone.
5. 1-β-(4-pyridyl)ethyl-7-chloro-4-(1H)-quinazolinone.
6. 1-β-(4-pyridyl)ethyl - 5 - methoxy-4-(1H)-quinazolinone.
7. 1-β-(4-pyridyl)ethyl-2-methyl-4-(1H)-quinazolinone.

References Cited by the Examiner

Chakravarti et al., Experientia, vol. 9, 1953, page 333.
Pakrashi et al., Tetrahedron, vol. 19, 1963, pages 1011–1026.

HENRY R. JILES, *Acting Primary Examiner.*

MARY U. O'BRIEN, *Assistant Examiner.*